(12) United States Patent
Volpone et al.

(10) Patent No.: US 9,928,939 B1
(45) Date of Patent: Mar. 27, 2018

(54) DEVICE AND METHOD FOR SPLICING SHIELDED WIRE CABLES

(71) Applicant: Delphi Technologies, Inc., Troy, MI (US)

(72) Inventors: Thomas A. Volpone, Cortland, OH (US); Troy A. Iler, Salem, OH (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 0 days.

(21) Appl. No.: 15/375,464

(22) Filed: Dec. 12, 2016

(51) Int. Cl.
| | |
|---|---|
| *H01B 7/00* | (2006.01) |
| *H01R 4/02* | (2006.01) |
| *H01R 9/24* | (2006.01) |
| *H01R 9/03* | (2006.01) |
| *H01R 43/02* | (2006.01) |
| *H01R 43/01* | (2006.01) |
| *H02G 15/18* | (2006.01) |
| *H01B 13/012* | (2006.01) |
| *B60R 16/02* | (2006.01) |

(52) U.S. Cl.
CPC ....... *H01B 7/0045* (2013.01); *B60R 16/0215* (2013.01); *H01B 13/01209* (2013.01); *H01R 4/029* (2013.01); *H01R 9/031* (2013.01); *H01R 9/2483* (2013.01); *H01R 43/01* (2013.01); *H01R 43/02* (2013.01); *H01R 43/0263* (2013.01); *H02G 15/18* (2013.01)

(58) Field of Classification Search
CPC ............ H01B 7/0045; H01B 13/01209; B60R 16/0215; H01R 4/029; H01R 9/031; H01R 9/2483; H01R 43/01; H01R 43/02; H02G 15/18
USPC ....................................................... 174/72 A
See application file for complete search history.

(56) References Cited

FOREIGN PATENT DOCUMENTS

| JP | 2001258125 | * | 9/2001 |
|---|---|---|---|
| WO | WO 2014/070851 | * | 5/2014 |

* cited by examiner

*Primary Examiner* — Timothy Thompson
*Assistant Examiner* — Charles Pizzuto
(74) *Attorney, Agent, or Firm* — Robert J. Myers (57) ABSTRACT

A wire cable assembly, such as those used in electric or hybrid electric vehicles, having a plurality of shielded wire cables that are spliced together is presented. The assembly includes a splicing device having a generally planar bus bar formed of a conductive material, wherein the exposed core conductors of the shielded wire cables are welded to the bus bar, thereby electrically interconnecting the exposed core conductors. A conductive sleeve encloses bus bar and interconnects the shield conductors of the shielded wire cables, providing shielding for the exposed core conductors and continuity for the shield conductors. An outer insulator enclosing the conductive sleeve. A method of splicing shielded wire cables using such a device is also presented herein.

14 Claims, 8 Drawing Sheets

DEVICE AND METHOD FOR SPLICING SHIELDED WIRE CABLES

TECHNICAL FIELD OF THE INVENTION

The invention generally relates to a splicing device and a method for joining shielded wire cables.

BACKGROUND OF THE INVENTION

Shielded wire cables typically include an insulated center conductor and a separate insulated shield conductor surrounding the center conductor insulation. The shield conductor may consist of a braided wire mesh, metal foil, or metalized film. The cables typically have a second insulation layer covering the shield conductor. Shielded wire cables have been long used for communications systems, such as in cable television transmission lines. Shielded wire cables are also finding use in high voltage applications in electric and hybrid electric vehicles. When shielded wire cables are spliced together, there is usually a need to electrically connect the shield conductors of the spliced cables as well as the center conductor, in order to maintain electrical continuity of the shield conductors. Interconnecting the shield conductors may be complicated because the shield conductors must be cut back from the spliced ends of the cable in order to join the center conductors. Interconnecting the shield conductors may be further complicated in a one-to-many splicing configuration, sometimes referred to as a Y-splice or H-splice.

Figures 1A, 1B:
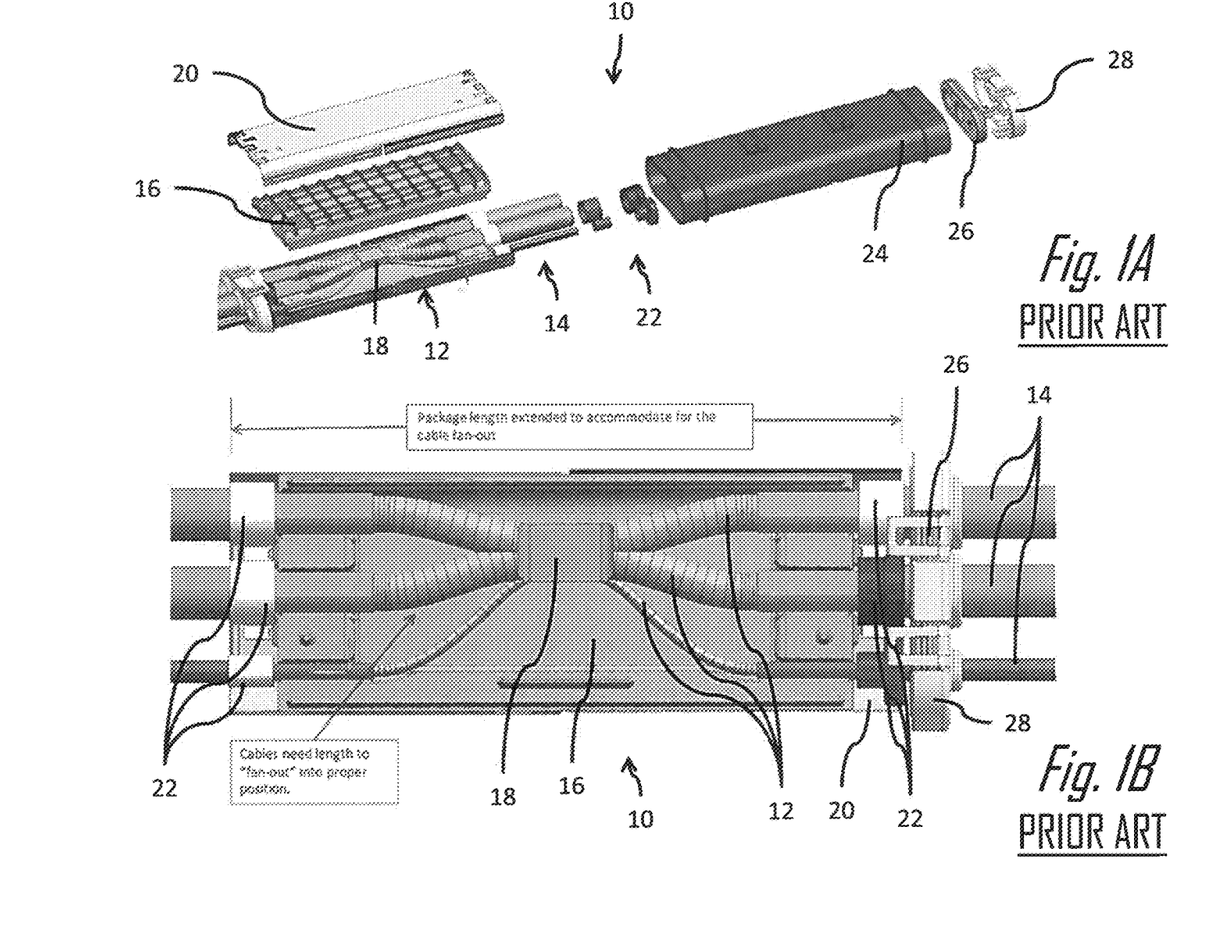
FIG. 1A is an exploded view of a shielded wire harness assembly having a spliced joint in accordance with the prior art.
FIG. 1B is a cut away view of the shielded wire harness assembly of FIG. 1A in accordance with the prior art.

A splicing device and a method for splicing shielded wire cables is described in International Patent Publication No. 2014/070851 published May 8, 2014, herein incorporated by reference in it entirely. According to the splicing device 10 shown in FIGS. 1A and 1B, the core conductors 12 of the shielded cables 14 are spliced together by sonically welding them to one another and placed within an inner insulator 16 that insulates the welded core conductors 18. The inner insulator is placed inside a conductive sleeve, i.e. a shield 20, that interconnects conductive ferrules 22 attached to the shield conductors of the shielded cables 14, thereby providing electrical continuity of the shield conductors 14 over the spliced core conductors 18. The shield 20 is placed inside an outer insulator, i.e. a housing 24 that includes cable seals 26 and end caps 28 to retain the seals 26 within the housing 24. This splicing device 10 requires a "fan out" of the core conductors 12 from the welded splice 18. This "fan-out" increases the length of cable required and increase the overall length of the splicing device 10. Therefore, an alternative splicing device and a method of splicing shielded cables that reduces the overall cable and splicing device length remains desired.

At the time of filing this application, the invention described in the instant application and the invention described in International Patent Publication No. 2014/070851 are both owned by Delphi Technologies, Inc.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with one embodiment of this invention, a wire harness assembly is provided. The wire harness assembly includes a first shielded wire cable having a first exposed shield conductor and a second exposed shield conductor separated by an first exposed core conductor, a second shielded wire cable having a third exposed shield conductor and a fourth exposed shield conductor separated by an second exposed core conductor, and a generally planar bus bar formed of a conductive material. The first and second exposed core conductors are welded to the bus bar, thereby electrically connecting the first and second exposed core conductors. The wire harness assembly also includes a conductive sleeve enclosing a portion of the first, second, third, and fourth exposed shield conductors and an outer insulator enclosing the conductive sleeve.

The wire harness assembly may further include an inner insulator enclosing the bus bar and disposed within the conductive sleeve. In addition, the wire harness assembly may include first and second seals formed of an electrically conductive elastomeric material contained within an end of the outer insulator. The first and second seals are in contact with the conductive sleeve. The conductive sleeve may define barbs that are configured to penetrate the first and second seals.

The wire harness assembly may include a first ferrule attached to the first shield conductor, a second ferrule attached to the second shield conductor, a third ferrule attached to the third shield conductor and a fourth ferrule attached to the fourth shield conductor. The conductive sleeve defines a first contact attached to the first ferrule, a second contact attached to the second ferrule, a third contact attached to the third ferrule, and a fourth contact attached to the fourth ferrule, thereby providing a conductive path between the first, second, third, and fourth shield conductors. The outer diameters of the first and second shield conductor may be different than the outer diameters of the third and fourth shield conductors but the outer diameters the first, second, third, and fourth ferrules may be all the same. The first and third ferrules may be spaced the same distance apart from the bus bar and the second and fourth ferrules are spaced the same distance apart from the bus bar. The first and third ferrules may be spaced the same distance apart from the inner insulator and the second and fourth ferrules are spaced the same distance apart from the inner insulator.

Alternatively, the wire harness assembly may include first and second bands that are formed of an electrically conductive elastomeric material and contained within each end of the outer insulator. The first band is attached to the first and third shield conductors and the second band is attached to the second and fourth shield conductors. The first and seconds bands are in contact with the conductive sleeve, thereby providing a conductive path between the first, second, third, and fourth shield conductors. The conductive sleeve defines barbs configured to penetrate the first and second bands.

The inner insulator may define an unused cavity that is configured to contain a shielded wire cable. The conductive sleeve may include a tab that is folded over an end of the inner insulator, thereby enclosing the unused cavity.

In accordance with another embodiment of this invention, method of splicing shielded wire cables together is provided. The method includes the steps of:

providing a first shielded wire cable having a first exposed shield conductor and a second exposed shield conductor separated by a first exposed core conductor;

providing a second shielded wire cable having a third exposed shield conductor and a fourth exposed shield conductor separated by a second exposed core conductor;

providing a generally planar bus bar formed of a conductive material;

providing a conductive sleeve;

providing an inner insulator formed of a dielectric material;

welding the first and second exposed core conductors to the bus bar, thereby electrically connecting the first and second exposed core conductors;

disposing the bus bar within the inner insulator;

disposing the inner insulator and the first, second, third, and fourth exposed shield conductors within the conductive sleeve;

attaching the first, second, third, and fourth exposed shield conductors to the conductive sleeve, thereby providing a conductive path between the first, second, third, and fourth exposed shield conductors;

providing an outer insulator formed of a nonconductive material; and disposing the conductive sleeve within the outer insulator.

The conductive sleeve may define a first, second, third, and fourth contact and the method may also include the steps of:

providing a first, second, third, and fourth ferrule;

attaching the first, second, third, and fourth ferrules to the first, second, third, and fourth shield conductors respectively;

attaching the first, second, third, and fourth contacts to the first, second, third, and fourth ferrules respectively;

aligning the first, second, third, and fourth ferrules with the bus bar; and aligning the first, second, third, and fourth ferrules relative to the inner insulator.

The steps of aligning the first, second, third, and fourth ferrules with the bus bar and aligning the first, second, third, and fourth ferrules relative to the inner insulator may be performed prior to the step of welding the first and second core conductors to the bus bar.

Alternatively, the method may include the steps of:

providing first and second bands formed of an electrically conductive elastomeric material contained within an end of the outer insulator;

attaching the first band to the first and third shield conductors;

attaching the second band to the second and fourth shield conductors; and placing the first and seconds bands in contact with the conductive sleeve, thereby electrically connecting the first, second, third, and fourth shield conductors;

The conductive sleeve may define barbs that are configured to penetrate the first and second conductive bands.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Described herein are devices and a methods for splicing two or more shielded wire cables together. The devices and methods may be used to splice shielded wire cables with a single center conductor, i.e. solid wire, or multiple center connectors, i.e. stranded wire. The devices and methods described herein may also be used to splice two or more shielded wire cables to form a H-splice or Y-splice. The devices and methods described herein may be used for splicing a variety of shielded wire cables types, for example high voltage shielded wire cables designed for electrical or hybrid electrical vehicles.

Figure 2:
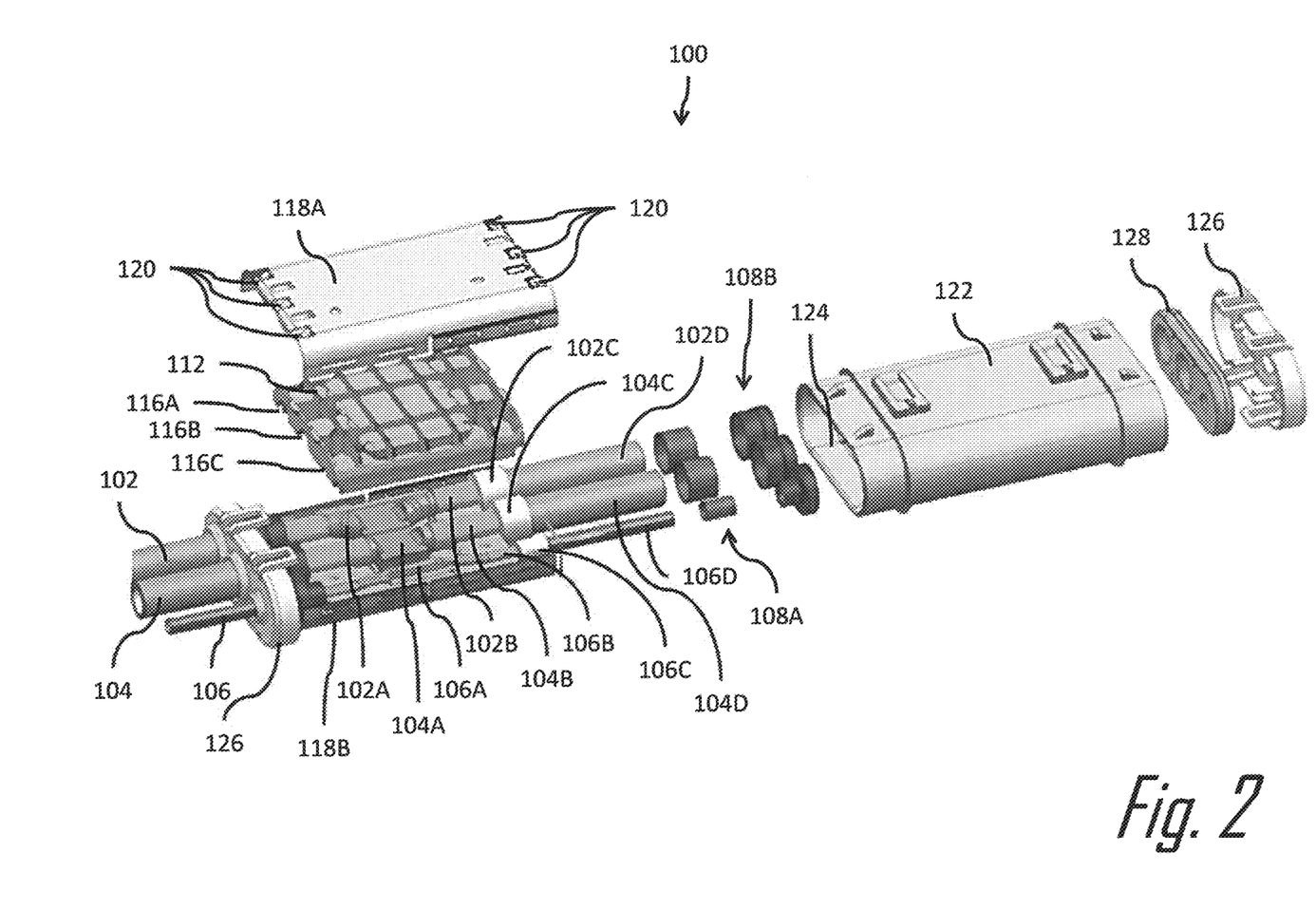
FIG. 2 is an exploded view of a shielded wire harness assembly having a spliced joint in accordance with a first embodiment.

FIG. 2 illustrates a non-limiting example of a wire harness assembly, hereinafter referred to as the assembly 100 that includes three shielded wire cables 102, 104, 106 that are spliced together in a double H-splice configuration. The assembly 100 includes a device configured to make a splice connection between the three shielded wire cables 102, 104, 106, hereinafter referred to as a splicing device. The three shielded wire cables 102, 104, 106 each have a core conductor 102A, 104A, 106A respectively that is axially surrounded by an inner insulation jacket 102B, 104B, 106B respectively. The inner insulation jackets 102B, 104B, 106B are axially surrounded by a shield conductor 102C, 104C, 106C respectively. The shield conductors 102C, 104C, 106C are axially surrounded by an outer insulation jacket 102D, 104D, 106D respectively. The core conductors 102A, 104A, 106A are preferably formed of a stranded, i.e. multi-wire core but may also be formed of a solid single wire core. The shield conductors 102C, 104C, 106C are preferably formed of a woven wire mesh, but may also be formed of an electrical conductive foil, e.g. a copper foil, aluminum foil, or a metallized plastic foil.

As illustrated in FIG. 2, a portion of the inner insulation jackets 102B, 104B, 106B, shield conductors 102C, 104C, 106C, and outer insulation jackets 102D, 104D, 106D, are removed to expose a portion of the core conductors 102A, 104A, 106A. The inner insulation jackets 102B, 104B, 106B, shield conductors 102C, 104C, 106C, and outer insulation jackets 102D, 104D, 106D are center stripped so that his removal splits each of the shield conductors 102C, 104C, 106C into two separate shield conductors. Alternatively, the cables 102, 104, 106 may be cut in two to form cut leads and the ends of the cut leads are stripped to expose a portion of the core conductors 102A, 104A, 106A.

An additional portion of each of the shield conductors 102C, 104C, 106C may be removed or cut way to provide adequate voltage creepage distance to prevent a leakage current between the core conductors 102A, 104A, 106A and the shield conductors 102C, 104C, 106C, thereby exposing inner insulation jackets 102B, 104B, 106B of the shielded cables 102, 104, 106. The exposed shield conductors 102C, 104C, 106C are folded back over the outer insulation jackets 102D, 104D, 106D and an inner ferrule 108A is placed between the inner insulation jackets 102B, 104B, 106B and the exposed shield conductors 102C, 104C, 106C of each of the shielded wire cables 102, 104, 106 and an outer ferrule 108B is placed over each of the exposed shield conductors 102D, 104D, 106D to provide a robust connection point for the shield conductors 102D, 104D, 106D. The ferrules 108 may be a closed or barrel-type ferrule that is attached to the shield conductors 102D, 104D, 106D by crimping or soldering prior to forming the connection or the ferrules 108 may be an open or clip-type ferrule that can be attached to the shield conductors 102D, 104D, 106D by crimping after forming the connection. Materials and methods used to attach the conductive ferrules 108 to the shield conductors 102C, 104C, 106C are well known to those skilled in the art.

Figure 3:
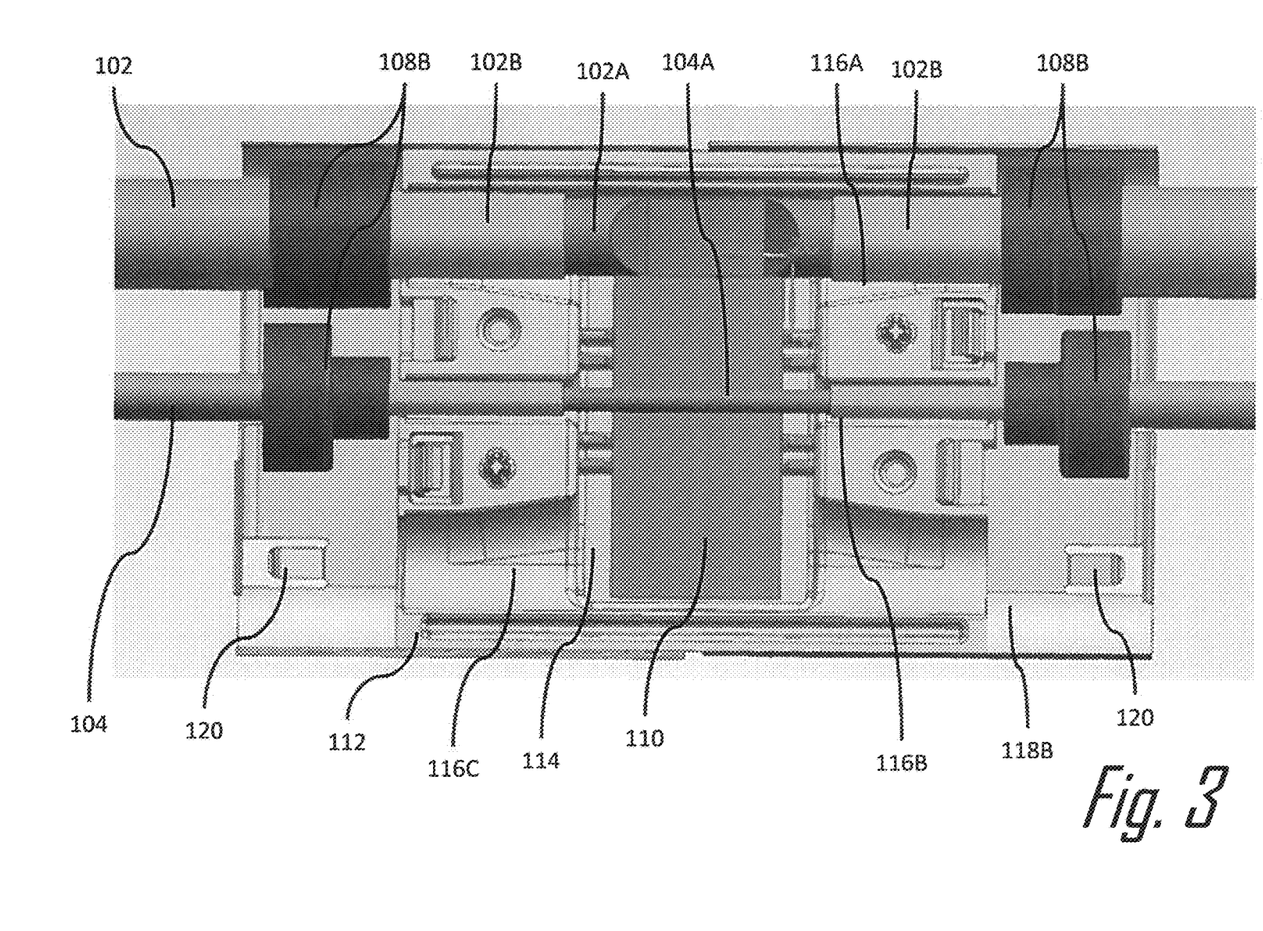
FIG. 3 is a partial assembly view of the shielded wire harness assembly of FIG. 2 illustrating a relationship between the bus bar and the ferrules and the inner insulator and the ferrules in accordance with the first embodiment.

FIG. 3 illustrates another non-limiting example of a wire harness assembly having a splicing device wherein only two shielded cables 102 and 104 are spliced together. The exposed portions of the core conductors 102A, 104A are attached to an electrically conductive bus bar 110 to electrically interconnect the core conductors 102A, 104A. The bus bar 110 has a generally rectangular shape and the core conductors 102A, 104A are attached to one of the major surfaces of the bus bar 110 by a welding process, preferably a sonic welding process although other welding processes such as resistance welding, soldering, brazing may be employed. The bus bar 110 may be formed of an copper or aluminum based alloy. Alternatively, when the cables 102, 104, 106 are cut in cut lads, the core conductors 102A, 104A, 106A are stacked or piggy-backed on one another when welded to the bus bar 110.

The wire cable assembly 100 includes an inner insulator 112 formed of dielectric material. The dielectric material may be a polymer material, such as glass-filled polyamide (commonly known by the trade name NYLON) or polybutylene terephthalate (PBT). The inner insulator 112 may be formed using an injection molding process or other plastic forming processes well known to those skilled in the art. The inner insulator 112 may be formed by two identical halves that are designed to enclose the bus bar 110, the exposed core conductors 102A, 104A and the exposed inner insulation jackets 102B, 104B of the shielded cables 102, 104.

The inner insulator 112 defines a lateral cavity 114 that is designed to accommodate the bus bar 110. The inner insulator 112 also defines three longitudinal cavities 116A, 116B, 116C extending from the lateral cavity 114 that are designed to accommodate the shielded cables 102, 104. As shown in FIG. 3, the size of the longitudinal cavities 116A, 116B, 116C may vary to accommodate shielded cables having different diameters.

The wire cable assembly 100 further includes a sleeve 118 formed of conductive material in which the inner insulator 112 is enclosed. The conductive material used to form the sleeve 118 is preferably a copper alloy, such as 425 brass and may be tin coated for corrosion resistance. The sleeve 118 defines contacts 120 that are designed to be in mechanical and electrical contact with the outer ferrules 108B attached to the shield conductors 102C, 104C, 106C of the shielded wire cables 102, 104, 106. The contacts 120 protrude from the sleeve 118 and form an arcuate shape configured to exert a spring force on the outer ferrules 108B.

Figures 4A, 4C:
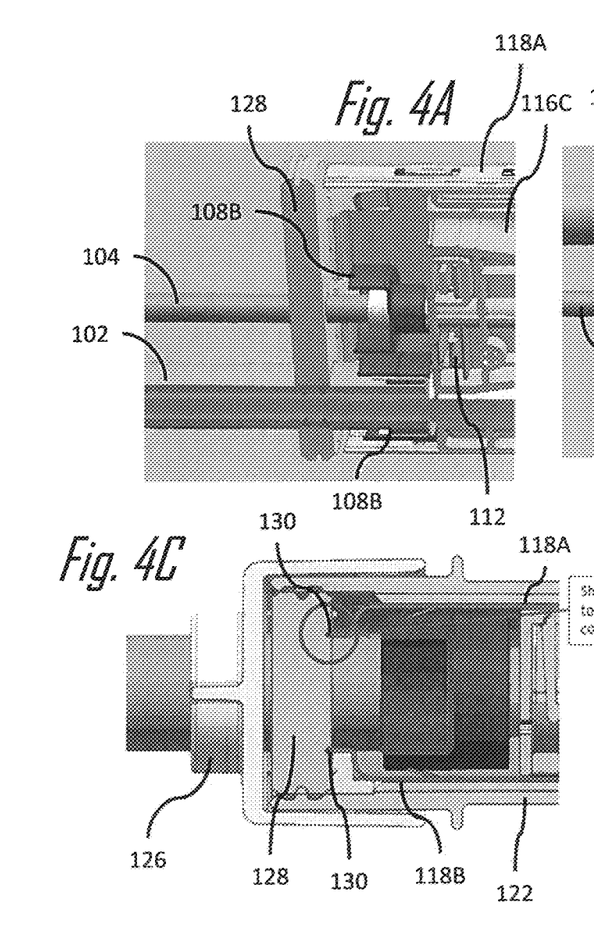
FIG. 4A is cut away view of the shielded wire harness assembly of FIG. 2 illustrating an open cavity in accordance with the first embodiment.
FIG. 4C is a cut away view of the shielded wire harness assembly of FIG. 2 illustrating a barb of the conductive sleeve penetrating the conductive seal in accordance with the first embodiment.
Figure 4B:
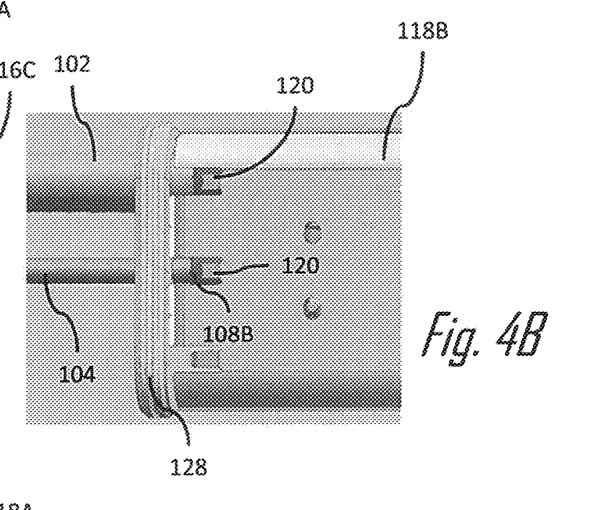
FIG. 4B is a partial assembly view of the shielded wire harness assembly of FIG. 2 illustrating an open cavity in accordance with the first embodiment.

As shown in FIGS. 4A and 4B, the sleeve 118 is made up of a first sleeve portion 118A that defines a first set of contacts 120 and a second sleeve portion 118B that defines a second set of contacts 120. The first sleeve portion 118A is configured to enclose the inner insulator 112 when mated with the second sleeve portion 118B. Features may be included in the joining surfaces of the first sleeve portion 118A and the second sleeve portion 118B to reduce electrical resistance between the two sleeve portions 118A, 118B. Alternatively, the first sleeve portion 118A and the second sleeve portion 118B may be secured together using conductive threaded fasteners. The first and second sleeve portions 118A, 118B may be designed with a hermaphroditic shape so that a single part may be used for both the first and second sleeve portions 118A, 118B. The inner insulator 112 may also be designed to have first and second portions with a hermaphroditic shape so that a single part may be used for both portions.

The wire cable assembly 100 further includes an outer insulator, hereinafter referred to as a housing 122 formed of a nonconductive material and defining a cavity 124 that is configured to enclose the sleeve 118. The wire cable assembly 100 also includes a pair of end caps 126 that are designed to sealably engage the shielded wire cables 102, 104, 106 and sealably engage the housing 122. The end caps 126 and outer housing 122 are designed to provide environmental protection by keeping contaminants such as dust, dirt, water, and other fluids away from to the exposed core conductors 102A, 104A, 106A, bus bar 110, and sleeve 118. The housing 122 and end caps 126 may be formed of a polymer material, such as NYLON or PBT. The end caps 126 may also include a sealing element formed of compliant material, such as silicone rubber, hereinafter referred to as seals 128.

Figure 4D:
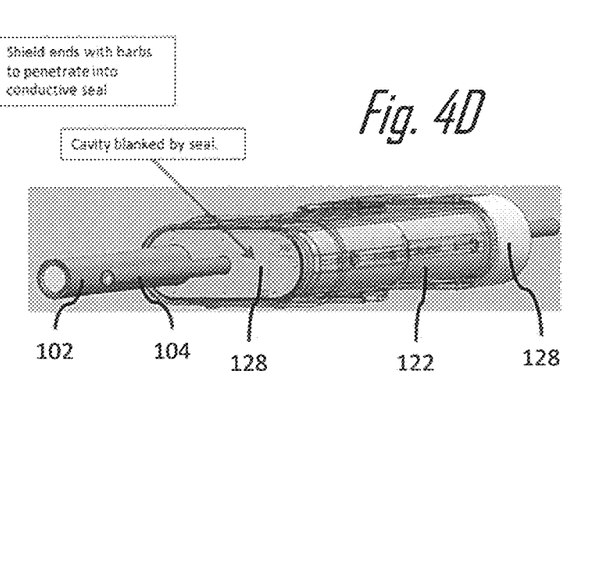
FIG. 4D is another partial assembly view of the shielded wire harness assembly of FIG. 2 illustrating an open cavity in accordance with the first embodiment.

In order to provide improved electromagnetic shielding, the seals 128 may be formed of an electrically conductive elastomeric material, such as a 30 durometer, high bleed silicone based material with carbon or copper impregnation. The conductive sleeve 118 may include pointed barbs 130, as shown in FIG. 4C, that extend from the ends of the sleeve 118 and pierce the seals 128 providing electrical continuity between the sleeve 118 and the seals 128 as shown in FIG. 4D. The conductive seals 128 may be used as shown in FIG.

4D when one of the longitudinal cavities 116A, 116B, 116C is unused to block an opening of an unused cavity 116C in the inner insulator 112.

Figures 5A, 5B:
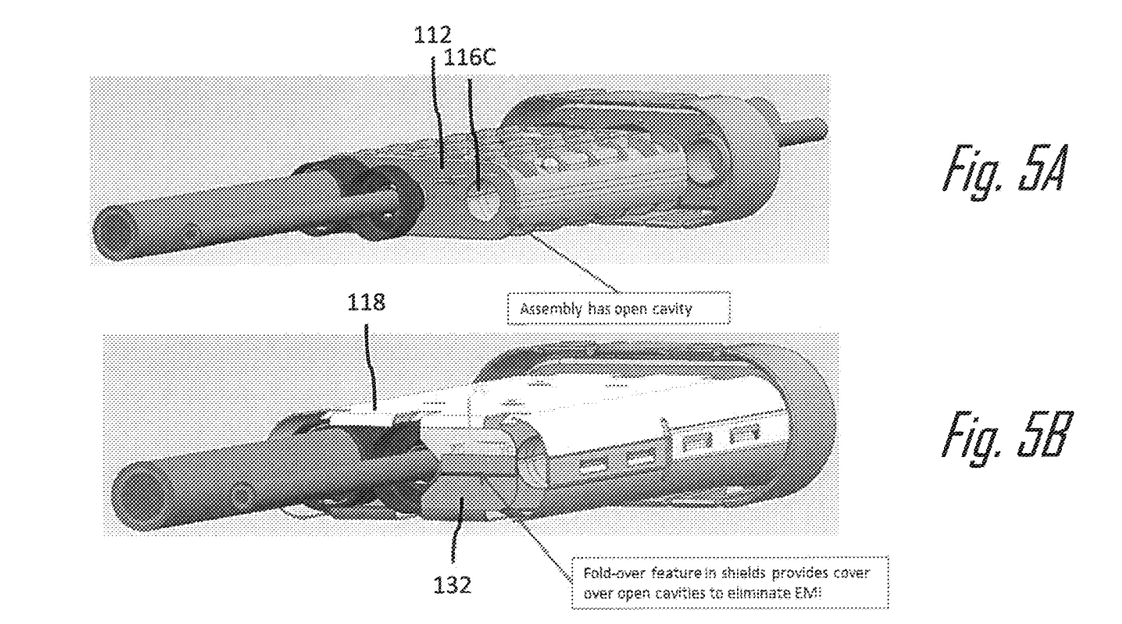
FIGS. 5A-5C is a progressive assembly view of the shielded wire harness assembly of FIG. 2 illustrating an open cavity in accordance with the first embodiment.
Figure 5C:
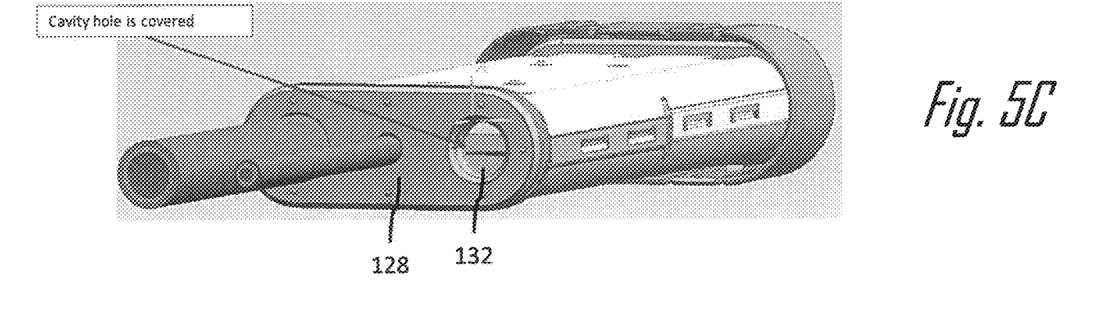

As shown in FIGS. 5A-5C, alternatively or in addition to the conductive seals 128, the sleeve 118 may include tabs 132 that can be folded over an opening of an unused cavity 116C in the inner insulator 112.

Figures 6A, 6B, 6C:
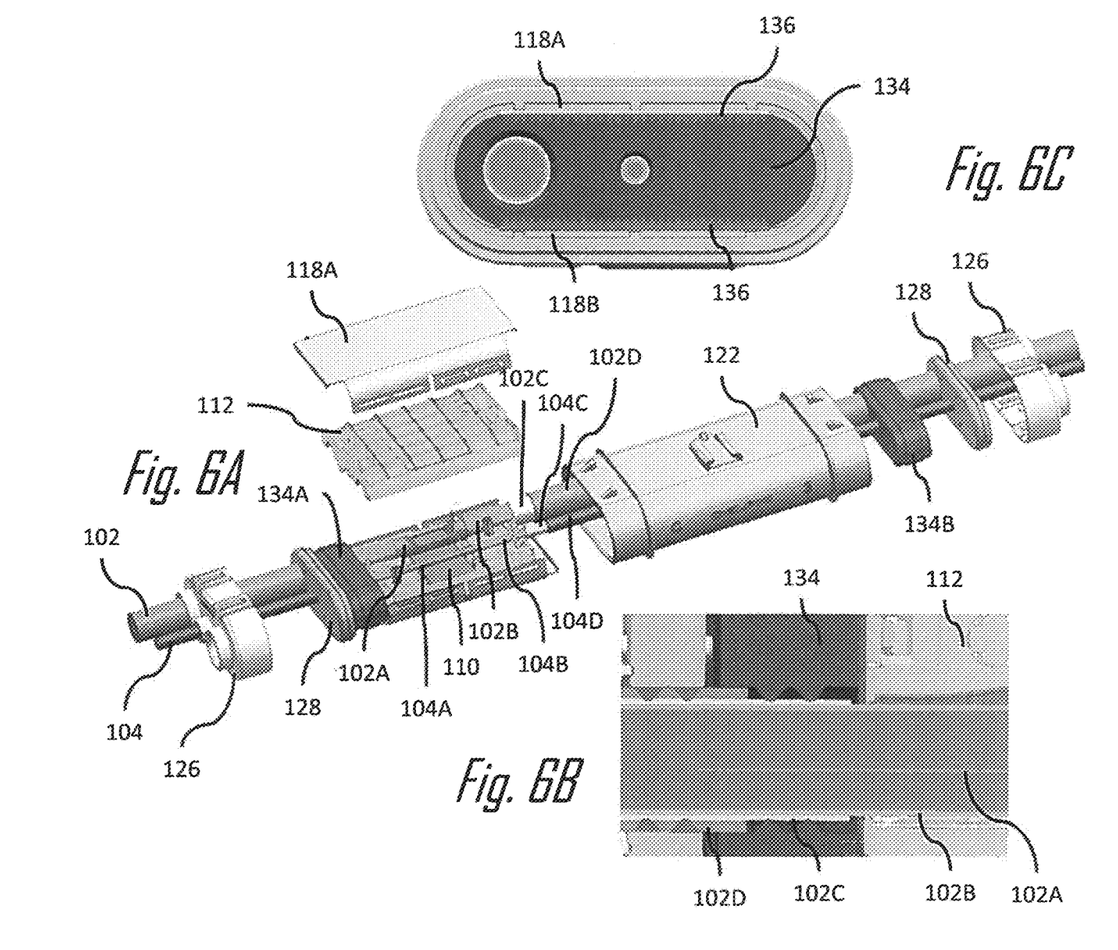
FIG. 6A is an exploded view of a shielded wire harness assembly having a spliced joint in accordance with a second embodiment.
FIG. 6B is a close up cut away view of the shielded wire harness assembly of FIG. 6A illustrating an interface between a conductive elastomeric band and a shield conductor of a shielded wire cable in accordance with the second embodiment.
FIG. 6C is a cut away view of the shielded wire harness assembly of FIG. 7A illustrating serrations on the conductive sleeve penetrating the conductive elastomeric band in accordance with the second embodiment.

As an alternative to the ferrules 108, as shown in FIG. 6A, the assembly may include a band 134 that is formed of an electrically conductive elastomeric material, such as TBD having openings in which the shield conductors 102C, 104C of the shielded cables 102, 104 are received. The shield conductors are in electrical contact with the bands as shown in FIG. 6B. As illustrated in FIG. 6C, the sleeve includes serrations 136 in the form of a saw-toothed ridge that are configured to penetrate the bands providing an electrical connection between the sleeve and thereby provide electrical continuity between all of the shield conductors.

Figure 7:
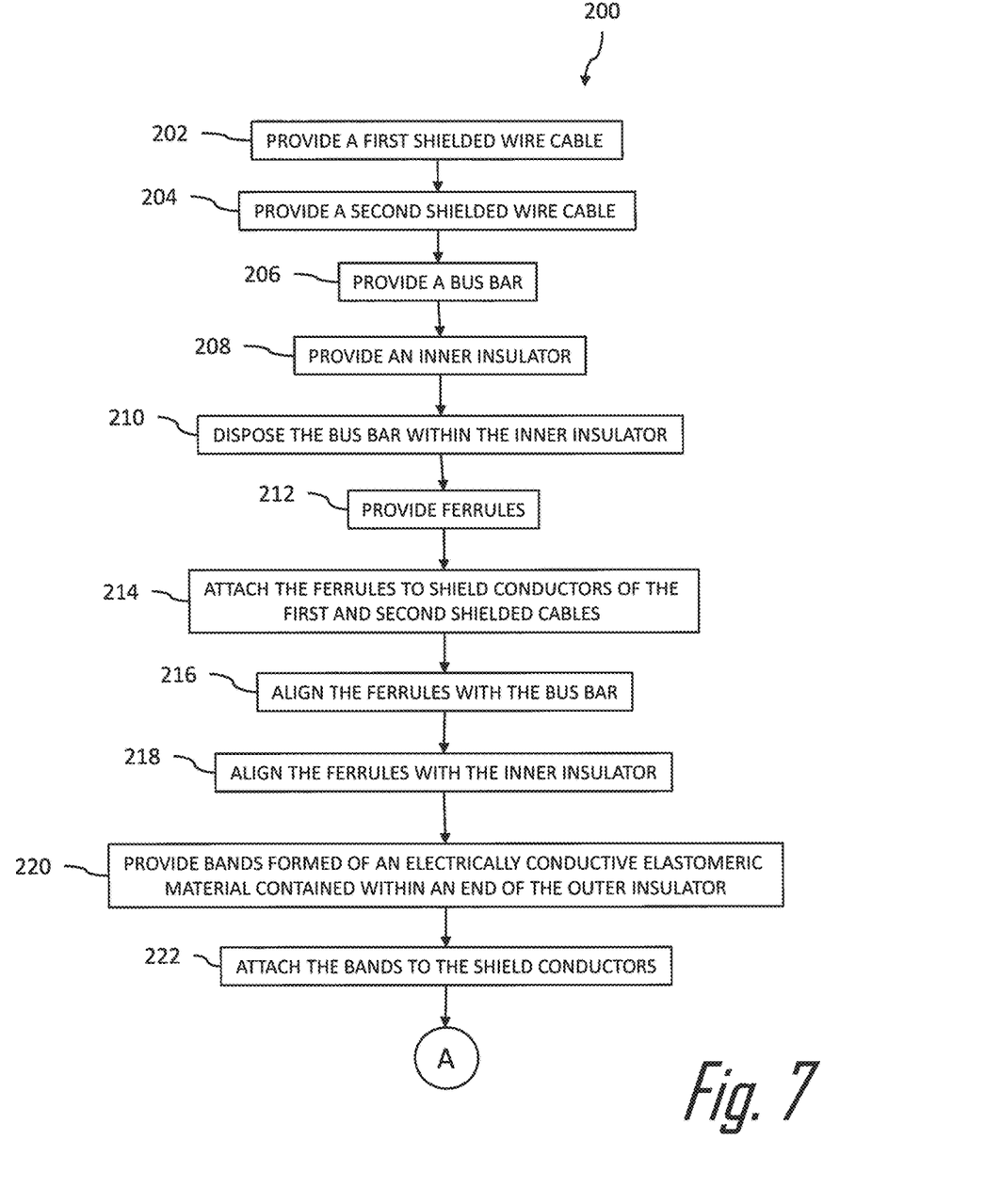
FIG. 7 is a flow chart of a method of splicing shielded wire cables together in accordance with a third embodiment.

FIG. 7 illustrates a non-limiting method 200 of splicing shielded wire cables together. The method 200 includes the following steps.

STEP 202, PROVIDE A FIRST SHIELDED WIRE CABLE, includes providing a first shielded wire cable 102 having a first exposed shield conductor 102C and a second exposed shield conductor 102C separated by a first exposed core conductor 102A.

STEP 204, PROVIDE A SECOND SHIELDED WIRE CABLE, includes providing a second shielded wire cable 104 having a third exposed shield conductor 104C and a fourth exposed shield conductor 104C separated by a second exposed core conductor 104A.

STEP 206, PROVIDE A BUS BAR, includes providing a generally planar bus bar 110 formed of a conductive material.

STEP 208, PROVIDE AN INNER INSULATOR, includes providing an inner insulator 112 formed of a dielectric material.

STEP 210, DISPOSE THE BUS BAR WITHIN THE INNER INSULATOR, includes disposing the bus bar 110 within the inner insulator 112.

STEP 212, PROVIDE FERRULES, is an alternative step that includes providing a first and second ferrule for each cable, each first and second ferrule including an inner ferrule 108A and an outer ferrule 108B.

STEP 214, ATTACH THE FERRULES TO SHIELD CONDUCTORS OF THE FIRST AND SECOND SHIELDED CABLES, is an alternative step that includes attaching the first and second ferrule ferrules 108 to the first, second, third, and fourth shield conductors respectively 102C, 104C. If ferrules are replaced by the conductive polymer, the conductive polymer is preferably applied STEP 224 is completed.

STEP 216, ALIGN THE FERRULES WITH THE BUS BAR, is an alternative step that includes aligning the first, second, third, and fourth ferrules 108 with the bus bar 110 so that the ferrules 108 are a proper, preferably an equal distance, from the edges of the bus bar 110.

STEP 218, ALIGN THE FERRULES WITH THE INNER INSULATOR, is an alternative step that includes aligning the first, second, third, and fourth ferrules 108 relative to the inner insulator 112 so that the ferrules 108 are a proper, preferably an equal distance, from the edges of the inner insulator 112. This step of aligning the ferrule with the inner insulator 112 may also be beneficial in properly aligning the ferrules with the contacts 120 of the conductive sleeve 118.

STEP 220, PROVIDE BANDS FORMED OF AN ELECTRICALLY CONDUCTIVE ELASTOMERIC MATERIAL CONTAINED WITHIN AN END OF THE OUTER INSULATOR, is an alternative step which includes providing first and second bands formed of an electrically conductive elastomeric material contained within an end of the outer insulator.

STEP 222, ATTACH THE BANDS TO THE SHIELD CONDUCTORS, is an alternative step which includes attaching the first band 134A to the first and third shield conductors 102C, 104C and attaching the second band 134A to the second and fourth shield conductors 102C, 104C.

STEPS 212-218 may be performed alternatively to STEPS 220-222.

STEP 224, WELD THE FIRST AND SECOND EXPOSED CORE CONDUCTORS TO THE BUS BAR, includes welding the first and second exposed core conductors 102A, 104A to the bus bar 110, thereby electrically connecting the first and second exposed core conductors 102A, 104A. When STEPS 216 and 218 are performed, they are preformed prior to STEP 224.

STEP 226, DISPOSE THE INNER INSULATOR WITHIN THE CONDUCTIVE SLEEVE, includes disposing the inner insulator 112 and the first, second, third, and fourth exposed shield conductors 102C, 104C within the conductive sleeve 118. STEP 226 may preferably occur before STEP 224.

STEP 228, ATTACH THE EXPOSED SHIELD CONDUCTORS TO THE CONDUCTIVE SLEEVE, includes attaching the exposed shield conductors 102C to the conductive sleeve 118. This may be accomplished by attaching the first, second, third, and fourth contacts 120 to the first, second, third, and fourth ferrules 108 respectively if STEPS 212-218 are performed or by placing the first and seconds bands 134A, 134B in contact with the conductive sleeve 118 if STEPS 220 and 222 are performed, thereby electrically connecting the first, second, third, and fourth shield conductors 102C, 104C though the conductive sleeve 118.

STEP 230, PROVIDE AN OUTER INSULATOR, includes providing an outer insulator 122 formed of a nonconductive material.

STEP 232, DISPOSE THE CONDUCTIVE SLEEVE WITHIN THE OUTER INSULATOR, includes disposing the conductive sleeve 118 within the outer insulator 122.

Accordingly, a wire cable assembly 100 having a splice device and a method 200 for joining together shielded wire cables 102, 104, 106 using such a device are provided. The shielding device provides the benefit of a shorter overall length than existing splicing devices for shielded cables because it eliminates the "fan out" length. The length reduction offers advantages of packaging a wire harness assembly made with such as splicing device, for example in a motor vehicle. The inventors have observed a reduction in the overall length of the splice device of 38% compared to existing splice devices. Using cut leads rather than center stripped cables provides benefits easier processing in the for stripping, ferrule and seal attaching.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A wire harness assembly, comprising:
    a first shielded wire cable having a first exposed shield conductor and a second exposed shield conductor separated by an first exposed core conductor;
    a second shielded wire cable having a third exposed shield conductor and a fourth exposed shield conductor separated by an second exposed core conductor;
    a generally planar bus bar formed of a conductive material, wherein the first and second exposed core conductors are welded to the bus bar, thereby electrically connecting the first and second exposed core conductors;
    a conductive sleeve enclosing a portion of the first, second, third, and fourth exposed shield conductors;
    an outer insulator enclosing the conductive sleeve;
    an inner insulator enclosing the bus bar and disposed within the conductive sleeve; and
    first and second seals formed of an electrically conductive elastomeric material contained within an end of the outer insulator, wherein the first and seconds seals are in contact with the conductive sleeve.

2. The wire harness assembly according to claim 1, wherein the conductive sleeve defines barbs configured to penetrate the first and second seals.

3. A wire harness assembly, comprising:
    a first shielded wire cable having a first exposed shield conductor and a second exposed shield conductor separated by an first exposed core conductor;
    a second shielded wire cable having a third exposed shield conductor and a fourth exposed shield conductor separated by an second exposed core conductor;
    a generally planar bus bar formed of a conductive material, wherein the first and second exposed core conductors are welded to the bus bar, thereby electrically connecting the first and second exposed core conductors;
    a conductive sleeve enclosing a portion of the first, second, third, and fourth exposed shield conductors;
    an outer insulator enclosing the conductive sleeve;
    an inner insulator enclosing the bus bar and disposed within the conductive sleeve;
    a first ferrule attached to the first shield conductor;
    a second ferrule attached to the second shield conductor;
    a third ferrule attached to the third shield conductor; and
    a fourth ferrule attached to the fourth shield conductor, wherein the conductive sleeve defines a first contact attached to the first ferrule, a second contact attached to the second ferrule, a third contact attached to the third ferrule, and a fourth contact attached to the fourth ferrule, thereby providing a conductive path between the first, second, third, and fourth shield conductors, wherein a first and second shield conductor outer diameter is different than a third and fourth shield conductor outer diameter and wherein the first, second, third, and fourth ferrules all have the same ferrule outer diameter.

4. The wire harness assembly according to claim 3, wherein the first and third ferrules are spaced the same distance apart from the bus bar and the second and fourth ferrules are spaced the same distance apart from the bus bar.

5. The wire harness assembly according to claim 4, wherein the first and third ferrules are spaced the same distance apart from the inner insulator and the second and fourth ferrules are spaced the same distance apart from the inner insulator.

6. A wire harness assembly, comprising:
    a first shielded wire cable having a first exposed shield conductor and a second exposed shield conductor separated by an first exposed core conductor;
    a second shielded wire cable having a third exposed shield conductor and a fourth exposed shield conductor separated by an second exposed core conductor;
    a generally planar bus bar formed of a conductive material, wherein the first and second exposed core conductors are welded to the bus bar, thereby electrically connecting the first and second exposed core conductors;
    a conductive sleeve enclosing a portion of the first, second, third, and fourth exposed shield conductors;
    an outer insulator enclosing the conductive sleeve;
    an inner insulator enclosing the bus bar and disposed within the conductive sleeve; and
    first and second bands formed of an electrically conductive elastomeric material contained within an end of the outer insulator, wherein the first band is attached to the first and third shield conductors, wherein the second band is attached to the second and fourth shield conductors, and wherein the first and seconds bands are in contact with the conductive sleeve, thereby providing a conductive path between the first, second, third, and fourth shield conductors.

7. The wire harness assembly according to claim 6, wherein the conductive sleeve defines barbs configured to penetrate the first and second bands.

8. A wire harness assembly comprising:
    a first shielded wire cable having a first exposed shield conductor and a second exposed shield conductor separated by an first exposed core conductor;
    a second shielded wire cable having a third exposed shield conductor and a fourth exposed shield conductor separated by an second exposed core conductor;
    a generally planar bus bar formed of a conductive material, wherein the first and second exposed core conductors are welded to the bus bar, thereby electrically connecting the first and second exposed core conductors;
    a conductive sleeve enclosing a portion of the first, second, third, and fourth exposed shield conductors;
    an outer insulator enclosing the conductive sleeve;
    an inner insulator enclosing the bus bar and disposed within the conductive sleeve, wherein the inner insulator defines an unused cavity configured to contain a shielded wire cable and wherein the conductive sleeve includes a tab that is folded over an end of the inner insulator, thereby enclosing the unused cavity.

9. A method of splicing shielded wire cables together, comprising the steps of:
    providing a first shielded wire cable having a first exposed shield conductor and a second exposed shield conductor separated by a first exposed core conductor;
    providing a second shielded wire cable having a third exposed shield conductor and a fourth exposed shield conductor separated by a second exposed core conductor;
    providing a generally planar bus bar formed of a conductive material;
    providing a conductive sleeve;
    providing an inner insulator formed of a dielectric material;

disposing the bus bar within the inner insulator;

welding the first and second exposed core conductors to the bus bar, thereby electrically connecting the first and second exposed core conductors;

disposing the inner insulator and the first, second, third, and fourth exposed shield conductors within the conductive sleeve;

attaching the first, second, third, and fourth exposed shield conductors to the conductive sleeve, thereby providing a conductive path between the first, second, third, and fourth exposed shield conductors;

providing an outer insulator formed of a nonconductive material;

disposing the conductive sleeve within the outer insulator, wherein the conductive sleeve defines a first, second, third, and fourth contact;

providing a first, second, third, and fourth ferrule;

attaching the first, second, third, and fourth ferrules to the first, second, third, and fourth shield conductors respectively; and attaching the first, second, third, and fourth contacts to the first, second, third, and fourth ferrules respectively.

10. The method of claim 9, further comprising the step of aligning the first, second, third, and fourth ferrules with the bus bar.

11. The method of claim 10, further comprising the step of aligning the first, second, third, and fourth ferrules relative to the inner insulator.

12. The method of claim 11, wherein the steps of aligning the first, second, third, and fourth ferrules with the bus bar and aligning the first, second, third, and fourth ferrules relative to the inner insulator are performed prior to the step of welding the first, second, and third core conductors to the bus bar.

13. A method of splicing shielded wire cables together, comprising the steps of:

providing a first shielded wire cable having a first exposed shield conductor and a second exposed shield conductor separated by a first exposed core conductor;

providing a second shielded wire cable having a third exposed shield conductor and a fourth exposed shield conductor separated by a second exposed core conductor;

providing a generally planar bus bar formed of a conductive material;

providing a conductive sleeve;

providing an inner insulator formed of a dielectric material;

disposing the bus bar within the inner insulator;

welding the first and second exposed core conductors to the bus bar, thereby electrically connecting the first and second exposed core conductors;

disposing the inner insulator and the first, second, third, and fourth exposed shield conductors within the conductive sleeve;

attaching the first, second, third, and fourth exposed shield conductors to the conductive sleeve, thereby providing a conductive path between the first, second, third, and fourth exposed shield conductors;

providing an outer insulator formed of a nonconductive material;

disposing the conductive sleeve within the outer insulator;

providing first and second bands formed of an electrically conductive elastomeric material contained within an end of the outer insulator;

attaching the first band to the first and third shield conductors;

attaching the second band to the second and fourth shield conductors; and placing the first and seconds bands in contact with the conductive sleeve, thereby electrically connecting the first, second, third, and fourth shield conductors.

14. The method according to claim 13, wherein the conductive sleeve defines barbs configured to penetrate the first and second bands.

\* \* \* \* \*